Figure 1:
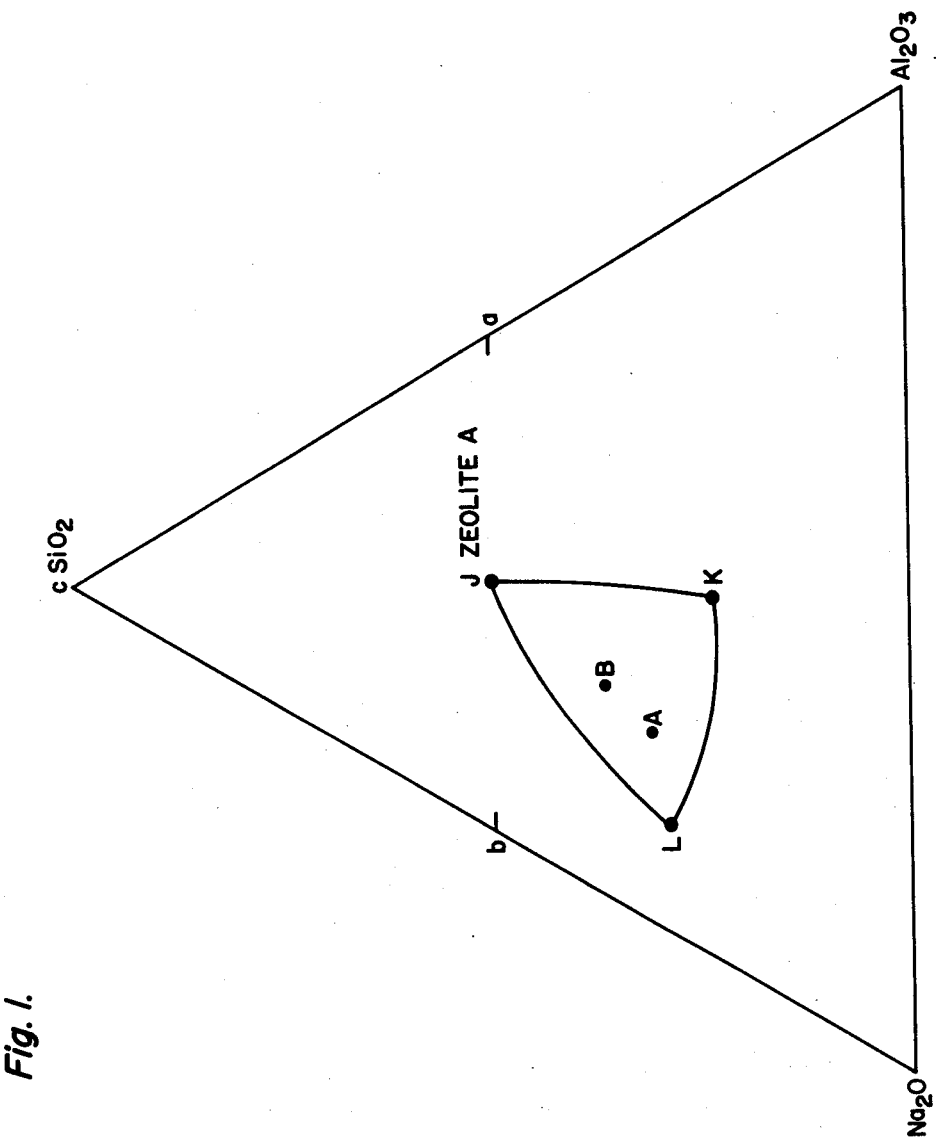

United States Patent [19]

Robertson

[11] 4,173,622
[45] Nov. 6, 1979

[54] ZEOLITE A CRYSTALS OF UNIFORMLY SMALL PARTICLE SIZE AND THE MANUFACTURE THEREOF

[75] Inventor: James A. Robertson, Levittown, Pa.

[73] Assignee: FMC Corporation, Philadelphia, Pa.

[21] Appl. No.: 866,302

[22] Filed: Jan. 3, 1978

[51] Int. Cl.² .............................................. C01B 33/28
[52] U.S. Cl. ..................................... 423/329; 423/328
[58] Field of Search .............. 423/328, 329, 330, 118; 252/455 Z

[56] References Cited

U.S. PATENT DOCUMENTS

| | | | |
|---|---|---|---|
| 3,071,434 | 1/1963 | Frillette et al. | 423/329 |
| 3,310,373 | 3/1967 | Johnson | 423/329 |
| 3,321,272 | 5/1967 | Kerr | 423/329 |
| 3,510,258 | 5/1970 | Hindin et al. | 423/329 |
| 3,574,538 | 4/1971 | McDaniel et al. | 423/329 |
| 3,692,475 | 9/1972 | Johnson | 423/329 |
| 3,769,386 | 10/1973 | Rundell et al. | 423/263 |
| 3,808,326 | 4/1974 | McDaniel et al. | 423/329 |
| 3,890,425 | 6/1975 | Stevens et al. | 423/127 |
| 3,890,426 | 6/1975 | Stevens et al. | 423/127 |
| 3,947,482 | 3/1976 | Albers et al. | 260/448 C |
| 3,949,059 | 4/1976 | Elliott | 423/329 |
| 3,966,883 | 6/1976 | Vaughan et al. | 423/329 |
| 4,007,253 | 2/1977 | Puppe et al. | 423/329 |

FOREIGN PATENT DOCUMENTS 1097860  1/1968  United Kingdom ..................... 423/329

OTHER PUBLICATIONS

Zhdanov, "Molecular Sieve Zeolites-I", 1971, pp. 36 & 37.

Primary Examiner—Edward J. Meros
Attorney, Agent, or Firm—Robert W. Kell; Frank Ianno

[57] ABSTRACT

In the manufacture of zeolite A crystals, characterized by a size in the range of about 1 to about 10 μm (micrometers or microns) the crystal size is controlled to within the range of ± 1 μm by seeding a sodium aluminum silicate gel that is free of nucleating particles with a predetermined number of comminuted zeolite A crystals having a number average particle size less than about 0.5 μm.

4 Claims, 2 Drawing Figures

Fig. I.

ZEOLITE A CRYSTALS OF UNIFORMLY SMALL PARTICLE SIZE AND THE MANUFACTURE THEREOF

The present invention concerns a method for the manufacture of zeolite A crystals, of uniformly small particle size and more specifically, zeolite A crystals that are characterized by a size less than 10 $\mu$m and preferably within the range of about 2 $\mu$m to about 6 $\mu$m and a crystallite size distribution of $\pm 1$ $\mu$m.

Zeolites have long been utilized for their ion exchange properties and many commercial water softeners operate on the principle that in passing hard water through a zeolite bed, the calcium ions that are present in the hard water are replaced with sodium ions. More recently, consideration has been given to including zeolites in household washing powder mixtures as a partial replacement for the phosphates normally present in such compositions which have come under ever increasing criticism because of alleged effects that such phosphates have on the ecology. The addition of zeolites to home laundering formulations as a partial replacement for the phosphates employed in the past is evident from examination of such formulations from the market place.

Commercial zeolite products may vary in particle size over a wide range as dictated by use requirements. Some applications require large aggregates of crystallites while others require individually-dispersed crystallites. Even with individually-dispersed crystallites it may be desirable to control the crystallite size within an exceptionally narrow range. Such a uniform crystallite zeolite A product having a uniform particle size under about 10 $\mu$m as well as the method of manufacturing such small but uniformly sized zeolite crystals form the subject matter of this invention.

Seeding, per se, is well known in the chemical art for increasing the growth rate of crystals and the prevention or supersaturation. Seeding normally occurs in zeolite production indirectly through autogeneously formed seeds as discussed by Donald W. Breck at page 338 of "Zeolite Molecular Sieves", published by John Wiley and Sons, Inc. (1974).

The seeding of zeolite precursor compositions has also found use, particularly in the manufacture of faujastic type zeolites and zeolite X and Y. U.S. Pat. Nos. 3,321,272, 3,510,258, 3,890,425, 3,890,426, 3,966,883 and 4,007,253 refer to the advantages of seeding with zeolite particles.

The addition of nucleation mixtures to promote crystalline zeolite formation is suggested in U.S. Pat. Nos. 3,949,059 and 3,947,482.

Amorphous nucleation centers having a particle size of 0.005 to 0.05 $\mu$m are disclosed as initiating crystallization of zeolite aluminometallo silicates in U.S. Pat. No. 3,769,386.

U.S. Pat. Nos. 3,574,538 and 3,808,326 suggest the addition from about 0.1 to about 10 weight percent of type X zeolite seed particles having a particle size between 0.01 and 0.05 $\mu$m to promote the crystallization of faujasite.

U.S. Pat. No. 3,310,373 teaches that the growth rate of aluminosilicate crystals can be increased under conditions of attrition. The crystalline particles, as they are formed, are continuously comminuted to a finely divided size less than 5 $\mu$m.

Although each of the foregoing techniques may be useful for the particular application referred to, none of these conventional processes is optimal for the large scale commercial production of zeolite crystals having a uniform particle size in the range of 1 $\mu$m to 10 $\mu$m. Crystal characteristics are of paramount importance in producing zeolites and must be controlled to an extent not usually encountered in chemical production. This is particularly true if the size of the crystals is critical.

The standard practice in the chemical industry has been to add a small undetermined quantity of seed crystals to trigger crystallization. The result is that the rate of crystallization proceeds geometrically, the new crystals as they are formed acting as nuclei for addition crystal formation. Equilibrium between the crystals formed and dissolved solids in solution is quickly established. Under equilibrium conditions, the number of crystals present may be infinitely larger than the number of seed crystals added and bears no relation thereto.

The procedure to be described differs from the foregoing in that a specific number of crystals of a predetermined size are uniformly dispersed throughout a zeolite precursor gel. The result is that each individual seed crystal feeds upon the gel and grows in size independently. Equilibrium conditions between crystals and dissolved solids in solution is reached, depending upon the temperature in about 0.3 to about 1.0 hours. Within that period of time, additional crystals, formed by autonucleation, are not produced. In this latter procedure, the number of crystals present under equilibrium conditions is the same as the number of seed crystals added.

It is an object of the present invention to manufacture zeolite A crystals having a uniform size in the range of about 1 to about 10 $\mu$m. Another object of the present invention is to reduce the amount of zeolite C that is coprecipitated with zeolite A.

The above objects and other advantages of this invention are achieved by treating a sodium aluminum silicate gel, the chemical composition of which is such that zeolite A crystals will form on crystallization to remove all particles that would serve as nucleation sites for crystallization and then uniformly distributing throughout the sodium aluminum silicate gel, a predetermined amount of zeolite A seed crystals having a number average particle size less than 0.5 $\mu$m. The seed crystals are preferably added to the gel as an aqueous slurry. The effect of this critical seeding is that each added seed crystal grows as an isolated identity so the number of final crystallites is always the same as the total number of seed crystals and the size of the final crystal is related to the number of seeds feeding from a limited supply of gel.

The zeolite A crystals grow from isolated nuclei at a rate that depends primarily upon temperature. A suitable crystallization temperature for zeolite A is above 70° C., preferably in the range of about 70°–100° C. In the absence of suitable nuclei, crystallization is delayed and even inhibited. In the presence of uniformly-sized nuclei, however, growth is exceptionally uniform, resulting in a product of narrow crystallite size distribution.

Figure 2:
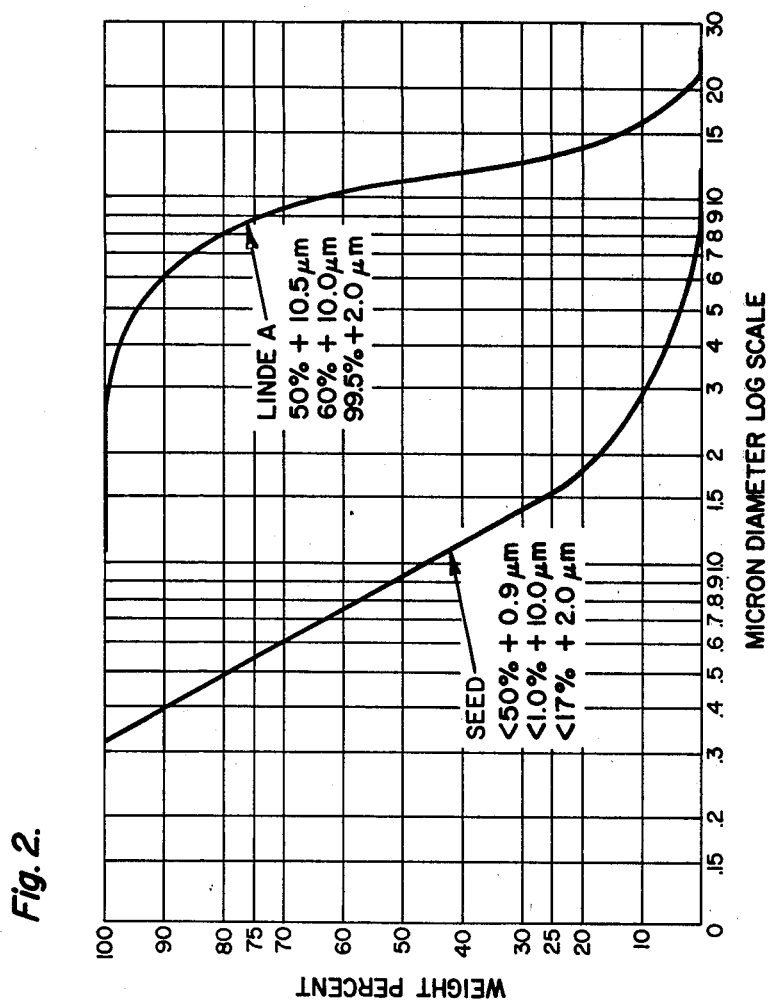

The improved process of the present invention will become more apparent upon reference to the ensuing description and appended claims and drawings wherein:

FIG. 1 is a three phase diagram from which one may determine the sodium aluminum silicate compositions that are precursors to zeolite A formation; and FIG. 2 is a reproduction of a particle size distribution curve of a commercially available (LINDE A TM) zeolite A and ball-milled zeolite A seed crystals made from it.

Measurements of the size distribution of zeolite A seed crystals added to a sodium aluminum silicate gel batch are difficult to make with the preferred seeds which have a number average particle size less than 0.5 $\mu$m, because the Coulter counter (which is used to determine the size distribution) has a lower limit of 0.3 $\mu$m. Since a large number of seeds are under 0.3 $\mu$m in size, it is easier to determine the quantity of seeds to be added by their effect.

A stock batch of zeolite A seed crystals may be made by ball-milling a water slurry of zeolite A in water until the weight average seed size, as determined with a Coulter counter, is less than about 0.9 $\mu$m. The number average seed size of this ball-milled product is less than 0.5 $\mu$m. Then different amounts of this seed stock are added to separate standard batches of a precursor zeolite A gel until the desired crystal size (1 $\mu$m to 10 $\mu$m) is obtained. Once established, the quantity of zeolite A seed crystals added is constant for a given zeolite A seed crystal stock and gel batch size.

The Gel Composition

Gel compositions that are within the area bounded by the lines joining points J, K, and L of FIG. 1 can crystallize to form zeolite A crystals and encompasses (on an anhydrous basis) from about 26 to 62 mole percent sodium oxide, from 10 to 37 mole percent aluminum oxide and from 24 to 50 mole percent of silicon dioxide. Such gel compositions contain from about 88 to 96 mole percent of water. The gel composition may contain higher amounts of water up to 98 mole percent to assure the most beneficial effects of seeding, particularly for compositions richer in sodium oxide or silicon dioxide than the composition indicated at point B of FIG. 1.

Preferred gel compositions for the practice of this invention are those which on a dry basis range from 36 to 48 mole percent sodium oxide, from 16 to 24 mole percent aluminum oxide and from 35 to 42 mole percent silicon dioxide. Particularly preferred is the gel composition defined by point B in FIG. 1.

One variable which influences crystal growth is alkali content. The gel composition indicated at point A in FIG. 1 (a higher alkali composition) appears to nucleate more rapidly than those at point B. Therefore, point A formulations are more difficult to control by seeding. Nuclei appear to form autogeneously more rapidly than at point B and the mixture of added seed and autogeneous seed leads to over-seeding and small crystallite development.

In preparing a zeolite A precursor gel, pretreatment of the raw material is important. In addition to filtering gross impurities from silicate and aluminate solutions, polish filtration may be necessary to remove objectional fine particles which act as seed or nucleation sites. Undissolved silica (quartz) is particularly objectionable and can be removed by polish filtration or dissolution in excess sodium hydroxide through heating.

Filter aids such as diatomaceous earth can also be used to aid removal of fine particles from silicate or aluminate solutions.

Seed Preparation

If one assumes that all nuclei present in a crystallizing system grow individually, then in order to maintain, for example, a mean crystallite size of 4 $\mu$m in the product, added seed should be below b 0.5 $\mu$m in size. This means that if commercial zeolite A is to be added as seed, it must be milled, not lightly to separate loose aggregates as might be required to meet certain product sizing specifications, but intensely enough to disrupt the lattice and generate sub-crystallite fragments. Commercially available zeolite A, as shown in FIG. 2, may vary in size from about 3 $\mu$m to about 22 $\mu$m with a weight average particle size of 10.5 $\mu$m. When this product is ball-milled for about 66 hours, 80 weight percent of the zeolite A seed crystals formed are under 2 microns in size as shown by the weight average distribution curve of FIG. 2. The number average particle size of these zeolite A seed crystals is less than 0.5 $\mu$m.

Several types of milling may be used for seed preparation. Most effective is long time ball-milling of a wet slurry. Dry milling, including fluid energy milling, is less effective for several reasons. First, milling to sizes preferably below 0.5 $\mu$m requires high energy input and most industrial dry mills do not reduce the particle size below 100 $\mu$m. Second, the finest particles are often lost during dry milling. Third, when dry dielectric particles reach the 1 $\mu$m size range, they respond to electrostatic forces so as to behave as if wet and will plug lines, elbows, bends, feeders, etc. Wet milling, on the other hand, retains the fine particles, often suspends them out of the working area and yields a uniform, easily usable slurry. Milling can be extended in time or by multiple passes until the desired sizing is attained. As with dry milling, energy requirements are high to reach submicron particles. Vibratory or tumbling ball mills are also effective but the balls or cylinders must be heavy enough to crush the crystallites and to move in the thick suspension.

Quantity of Seed Required

Observations of zeolite crystal growth suggest that each nucleus acts independently of all others. It follows then, that the number of nuclei present determines the final size of the crystallites when all gel is consumed. If one assumes that all surfaces grow at the same linear rate for a given temperature and composition, one may control the crystallite size by (a) controlling the number of nuclei present, (b) controlling the size of the nuclei and (c) controlling the quantity of available gel. In a batch crystallization under standardized conditions, one need control only the number of nuclei.

A simple calculation will illustrate these concepts. Assume that it is determined, experimentally, that if 10 ml of the diluted zeolite A seed crystals (as described in Example 1) is added to 200 ml of a sodium aluminum silicate gel, crystallization is complete in 30 minutes at 100° C.; and that the cubic crystals of zeolite A produced are 2 $\mu$m in size. It is further assumed that the added seed are below 0.1 $\mu$m and that all natural seed has been removed from the gel. The linear growth rate for any crystal surface is, therefore, approximately 1 $\mu$m in 30 minutes and the cubic crystal grows at 2 $\mu$m in 30 minutes since opposite sides of the nucleus are growing simultaneously. To produce 4 $\mu$m particles from this gel, crystal growth must proceed for 60 minutes at which time all of the gel should be consumed (which terminates growth). Since 4 $\mu$m cubes have eight times the volume of 2 $\mu$m cubes, and as the total volume of solids remains the same after the crystallization step, only ⅛th as many seed nuclei are needed or 1.25 ml of the diluted seed stock in 200 ml of gel to produce uniform crystals 4 μm in size.

The calculations made in the preceding paragraph are based upon the assumption that the seed nuclei were less than about 0.1 μm in size. However, if single 4 μm cubic crystals of zeolite A were also added as seed, they would grow to 8 μm in the same time that a small seed would grow to 4 μm. Therefore, milled seed stocks will produce a range of crystallite sizes commensurate with their own size distribution. The number of larger seed particles over 0.5 μm in an unclassified milled stock (having a mean particle size [weight average] below about 0.9 μm) can, for practical purposes, be ignored.

Seeding a sodium aluminum silicate gel with a commercial unmilled zeolite will increase the crystallization rate but produce a much wider range of particle sizes than will seeding the same gel with milled zeolite crystals. Because any large seeds that are added grow at the same rate of surface deposition as the small seeds present, an 11 μm added seed will grow to 15 μm in the same time a 0.1 μm seed has grown to 4.1 μm. If zeolite crystal clusters, even though loose aggregates, are added as seed, a hard welded mass is attained larger than 10 μm in size and too strong to be broken by simple hammer milling.

The above calculations, based upon an estimated number average particle size have been substantiated by the empirical approach wherein the amount of diluted zeolite A seed crystals to be added to a particular gel that will produce zeolite crystals of the desired size is determined experimentally by observing the effect of seeding zeolite A precursor gels with varying quantities of a given stock solution of zeolite A seed crystals. The calculated weight (in grams) of milled zeolite A seed crystals (weight average about 0.93 μm) to be added to a zeolite A precursor gel to produce 1000 kilograms (one metric ton) of the desired product is summarized in Table I.

TABLE I

| Weight (grams) of Seed for 1000 Kg of Product | | | | |
|---|---|---|---|---|
| | Product Crystallite Size (μm) | | | |
| Seed Size (μm) | 2 | 3 | 4 | 5 |
| 0.01 | 0.125 | 0.037 | 0.0156 | 0.008 |
| 0.1 | 125 | 37 | 15.6 | 8 |
| 0.2 | 1000 | 296 | 125 | 64 |
| 0.3 | 3370 | 1000 | 422 | 216 |
| 0.4 | 8000 | 2370 | 1000 | 512 |
| 0.5 | 15,600 | 4630 | 1950 | 1000 |
| 1.0 | 125,000 | 37,000 | 15,600 | 8000 |

Zeolite C is the major impurity in zeolite A preparations and has a lower exchange capacity than zeolite A. Although complete elimination of zeolite C has not been achieved, its formation can be minimized by seeding with zeolite A crystals under 0.5 μm in particle size.

In the Examples that follow, it will be shown that when employing sodium aluminum silicate gel having a composition within the lines connecting the points K, J, and L in FIG. 1 and using a predetermined amount of uniformly sized zeolite A seed crystals, uniform zeolite A crystals are obtained within the desired size range. In general, when employing gel compositions within the range described in the preceeding sentence, formation of zeolite crystals approaching 10 μm in size indicate too few seed crystals have been added, while the formation of undesirably small zeolite A crystals is due to adding too many seed crystals to the gel. This empirical approach to the optimum amount of seed crystals required is more reliable than attempting to count these seeds since, as pointed out above, there is no practical method for determining the number of seed crystals that are under 0.3 μm in size.

In the following examples, as set forth to further amplify the present invention, all quantities are expressed in parts by weight unless otherwise indicated.

EXAMPLE 1

Preparation of Seed Crystals

A slurry of 200 parts of zeolite A (manufactured by the Linde Division of Union Carbide Corp., 270 Park Ave., New York, New York 10017 and designated "LINDE A ™) in 450 parts of water is ball-milled for 66 hours. By this process, the individual crystals are effectively broken down to a size <1 μm. A Coulter counter analysis using a 30 μm aperture (FIG. 2) shows the weight average particle size to be 0.92 μm. This result is not definitive of the smaller particles because the curve illustrated by FIG. 2 provides no information with respect to particles smaller than 0.3 μm. A large number of these immeasurably small seeds are present and may be the most effective seeds. One part by volume of this suspension of ball-milled zeolite A is diluted with water to 30 parts by volume. Ten milliliters of this diluted zeolite A seed crystal stock solution contains 0.148 g of solids (zeolite A seed crystals).

EXAMPLE 2

Determining the Quantity of Seed Crystals Required to Produce 4 Micron Crystal Size An aluminate solution is prepared by dissolving 115 parts of alumina hydrate in 77 parts of water and 77 parts sodium hydroxide at the boiling point. Two hundred parts of water is cautiously added to the aluminate solution at the boiling point with stirring and the solution filtered immediately.

To 270 parts of sodium silicate solution (38% solids) is added 10 parts of sodium hydroxide and the solution is boiled for one hour to dissolve residual silica. The hot silicate solution is poured into the cold (30°-40° C.) aluminate solution prepared as described in the preceeding paragraph and mixed by stirring for 2 minutes. The resulting gel has the anhydrous composition indicated at point B in FIG. 1, namely, 42.6 mole percent Na$_2$O, 21 mole percent Al$_2$O$_3$, and 36.4 mole percent SiO$_2$ and contains 93.7 mole percent water.

Two hundred parts by volume of this gel slurry is seeded with 10 parts by volume of the diluted zeolite A seed crystal stock solution described above in Example 1 (containing 0.148 g of zeolite A seed crystals in 10 ml of solution), stirred for an additional 2 minutes and homogenized. The temperature of the slurry so obtained is then raised to 100° C. and maintained at that temperature for ½ hour at which time crystallization appears to be complete. Examination of the zeolite A crystals under the microscope showed the crystals to be uniform cubes about 2 μm in size corresponding to a linear growth rate perpendicular to any face of about 2 μm per hour up to the time of gel depletion. In order to produce larger zeolite A crystals (4 μm in size instead of 2 μm in size), since a 4 μm zeolite A crystal has 8 times the volume of a 2 μm zeolite A crystal, it was calculated that the amount of zeolite seed crystals added to the gel should be reduced to one-eight of the amount added or 1.25 parts by volume for each 200 parts by volume of the sodium aluminum silicate gel of this Example.

EXAMPLE 3

Preparation of Zeolite A

Two hundred parts by volume of a sodium aluminum silicate gel prepared as described above in Example 2 is seeded with 1.25 parts by volume of the diluted zeolite A seed crystal stock solution described above in Example 1 (containing 0.148 g of zeolite A seed crystals in 10 ml of solution). The temperature of the sodium aluminum silicate gel is then raised to 100° C. and maintained at that temperature for 1 hour at which time crystallization appears to be complete. The slurry is then filtered, washed with distilled water, repulped with 600 parts by volume distilled water, refiltered and again washed with water. The filter cake is dryed at 100° C., brushed through a 30 and then an 80 mesh screen and finally is put through a Wiley mill with an 80 mesh screen.

The product analyzed 99% zeolite A, 1% zeolite C, and 0% gel by X-ray diffraction.

The moisture content, both free and bound, of this zeolite product is determined by heating the sample for one hour at a temperature of 800° C. Under these conditions, volatilization of all moisture is complete. The product contains 18.4% water.

The pH of a 1% slurry of the product of this Example (anhydrous) is 10.6.

The mean individual crystal size of this zeolite product is determined with a Fisher sub-sieve sizer (Fisher CAT-No. 14-311). This device uses an air permeability principle to measure mean particle size in the 0.2 to 50 $\mu$m range. A carefully regulated dry air flow passes through a uniformly packed sample, The flow rate, indicated by the liquid level in a manometer, is a function of the particle size of the sample. The mean particle size is read directly from the appropriate curve on a chart supplied as part of the sub-sieve sizer. The mean individual crystal size of the product of this Example is 4.7 $\mu$m.

The particle size limit of this zeolite product is determined by a microscope technique where the base powder is suspended in water, placed on a microscope stage, equipped with a calibrated eye piece reticle, and individually examined for a mass average particle size estimation and observation of the maximum particle size present. Since type A zeolite is a cubic crystal form, only one dimension is of concern. The zeolite particles prepared as described above in this Example are all under 10 $\mu$m in size.

The zeolite product of this Example has a calcium exchange capacity of 277 milligrams $CaCO_3$ per anhydrous gram of zeolite A determined by reacting the sample with an excess of calcium ion, separating the solids and determining the excess calcium ion remaining. The excess calcium ion is determined after filtration of the calcium-zeolite exchange slurry by titration with standard ethylene diamine tetraacetic acid.

The free alkali of this zeolite product is determined by titration with standard 0.1 normal HCl to two indicator end-points. The first end-point, phenolphthalein, is a measure of a caustic soda (NaOH) and one-half of the sodium carbonate. The second end-point, methyl orange, is a measure of the other one-half of the sodium carbonate. This zeolite product contains 0.63% free alkali (calculated as $Na_2O$).

EXAMPLE 4

A sodium aluminum silicate gel having the anhydrous composition 50% $Na_2O$, 19% $Al_2O_3$, and 31% $SiO_2$ (designated by point A in FIG. 1) and containing 93 mole percent water is prepared as described in Example 2 above. A 50% solution of sodium hydroxide (123.7 g) is heated almost to the boiling point and 56.3 g of $Al_2O_3 \cdot 3H_2O$ is added with stirring. Heating is continued until all solids are dissolved. To the aluminate solution so obtained is then added 253.3 ml of distilled water at 99° C. This diluted solution is poured into a preheated Waring Blender. The blender is turned on and 123.3 g of N Grade sodium silicate solution (37.6%) is quickly added. A gel is formed immediately upon mixing and is blended for about 2 minutes.

Fifty grams of this sodium aluminum silicate gel is added with 0.3 ml of the 30:1 diluted zeolite A seed crystal stock solution (containing 0.0044 g of zeolite A seed crystals). The gel is shaken and then aged for 45 minutes. The zeolite A crystals have a uniform size of 2.5 $\mu$m and are not aggregated. The product analyzes 97% zeolite A and 1.7% zeolite C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for the manufacture of zeolite A crystals that are uniform and less than ten microns in size which comprises the steps of:
    (a) preparing zeolite A seed crystals by comminuting zeolite A crystals until seed crystals having a number average particle size of less than about 0.5 $\mu$m have been obtained and any cluster crystals that may be present are broken up;
    (b) preparing a sodium aluminum silicate gel containing, on an anhydrous basis, from 26 to 62 mole percent sodium oxide, from 10 to 37 mole percent aluminum oxide, and from 24 to 50 mole percent silicone dioxide, said gel containing from about 88 to 98 mole percent water and being free of particles that would serve as nucleation sites for crystallization;
    (c) uniformly distributing throughout said gel a predetermined quantity of the comminuted zeolite A seed crystals, the quantity being such that said gel is depleted and crystal growth is terminated when said seed crystals have grown to the desired size;
    (d) maintaining said gel at a temperature above about 70° C. until crystallization of the gel is essentially complete; and
    (e) separating the zeolite A crystals so formed from the reaction mixture, the number of zeolite A crystals present in the product separated being substantially the same as the number of seed crystals added.

2. The process of claim 1 wherein at least 90 weight percent of the comminuted zeolite A seed crystals are less than about 3 microns in size.

3. The process of claim 1 wherein the sodium aluminum silicate gel contains on an anhydrous basis, from 36 to 48 mole percent sodium oxide, from 16 to 24 mole percent aluminum oxide and from 35 to 42 mole percent silicon dioxide.

4. The process of claim 1 wherein said sodium aluminum silicate gel has the anhydrous composition 42.6 mole percent $Na_2O$, 21 mole percent $Al_2O_3$, and 36.4 mole percent $SiO_2$.

* * * * *